Jan. 18, 1949.   C. LORBER   2,459,231
COMBINATION QUIZ DEVICE
Filed June 21, 1946   2 Sheets-Sheet 1

NAME Charles Lorber   Inventor

By

Attorney

Jan. 18, 1949. C. LORBER 2,459,231
COMBINATION QUIZ DEVICE
Filed June 21, 1946 2 Sheets-Sheet 2

FIG. 5.

| YOUR I.Q. TEST IN A FLASH<br>Write "T" for true and "F" for false opposite each statement | Written answers |
|---|---|
| You see objects with the inside of your eye. | — 27 |
| Rubber is not made from the bark of a rubber tree. | |
| Daylight saving time was first adopted in New York City. | |
| The name of Walter Winchell's newspaper column is named "News in a Flash". | |
| Seaweed is a source of iodine. | —12 |
| A semaphore is a copper urn used in making tea. | |
| A young seal has a bull for a father, a cow for a mother, and is known as a pup. | |
| The backbone of a camel is humped. | —26 |
| A roe is a name for a steak in mahogany, a female deer, and fish eggs. | |
| Bats lay eggs. | |

10 → (pointing to "Daylight saving time...")

| | |
|---|---|
| F | You see objects with the AID of the outside light on the object. |
| T | Rubber is made from the latex or milk of the rubber tree. |
| T | In 1918. |
| F | "On Broadway". |
| T | It is prepared from kelp which is the ashes of seaweed. |
| F | It is an apparatus for giving signals. |
| T | True. |
| F | The backbone is straight. The hump is fat. |
| T | The name applies to all three. |
| F | They give birth to their young alive. |

Inventor
Charles Lorber
By [signature]
Attorney

Patented Jan. 18, 1949

2,459,231

UNITED STATES PATENT OFFICE 2,459,231

COMBINATION QUIZ DEVICE

Charles Lorber, Louisville, Ky.

Application June 21, 1946, Serial No. 678,495

4 Claims. (Cl. 35—48)

This invention relates to educational appliances and has special reference to a knowledge testing device. More particularly the invention relates to a knowledge testing device or means associated with a newspaper or other like periodical wherein the periodical is made up in two or more independent sections assembled one on top of another and wherein the top section is freely slidable with respect to the one below.

One important object of the invention is to provide knowledge testing means which can be carried on sheets of an ordinary newspaper.

It is quite a common thing to have in a newspaper a series of questions or problems printed on one of its pages with a reference associated with the series to the effect that the answers to the series will be found on another page. The size of the sheets in a newspaper is such as to ordinarily make it very inconvenient to bring the answers and questions into juxtaposition for comparison.

A second important object of the invention is to provide a device for the purpose set forth wherein, by a simple shifting of one section of a newspaper over another questions or problems and their answers can be readily moved into juxtaposition for comparison.

With the above and other objects in view as will presently be apparent, the invention consists in general of certain novel details of construction and combinations of parts hereinafter fully described, illustrated in the accompanying drawings and particularly claimed.

In the accompanying drawings like characters of reference indicate like parts in the several views, and:

Figure 5 is a fragmentary view of the right portion of the first page of the upper section shown in Figure 2 and disclosing types of certain verbal tests suitable for use in connection with this invention.

Figure 6 is a fragmentary view of the right portion of the first page of the lower section and disclosing information relative to the truth or falsity of the verbal tests.

Figure 1:
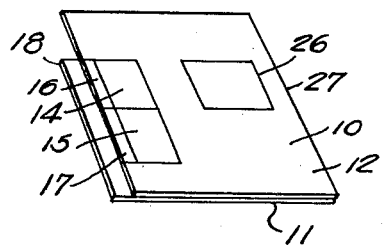
Figure 1 is a diagrammatic view showing two sections of a newspaper including this invention and having the upper section slid to the right to expose the left edge portion of the lower section.
Figure 2:
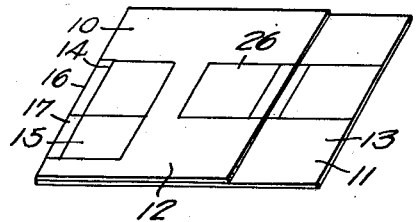
Figure 2 is a similar view with the upper section slid to the left to expose the right edge portion of the lower section.
Figure 4:
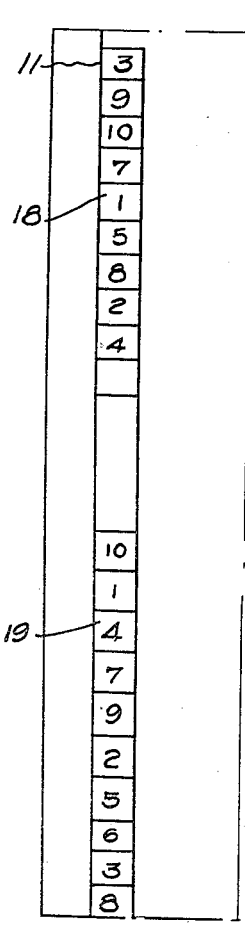
Figure 4 is a fragmentary view of the left portion of the first page of the lower section shown in Figure 1 and disclosing the answers to the problems shown in Figure 3.
Figure 3:
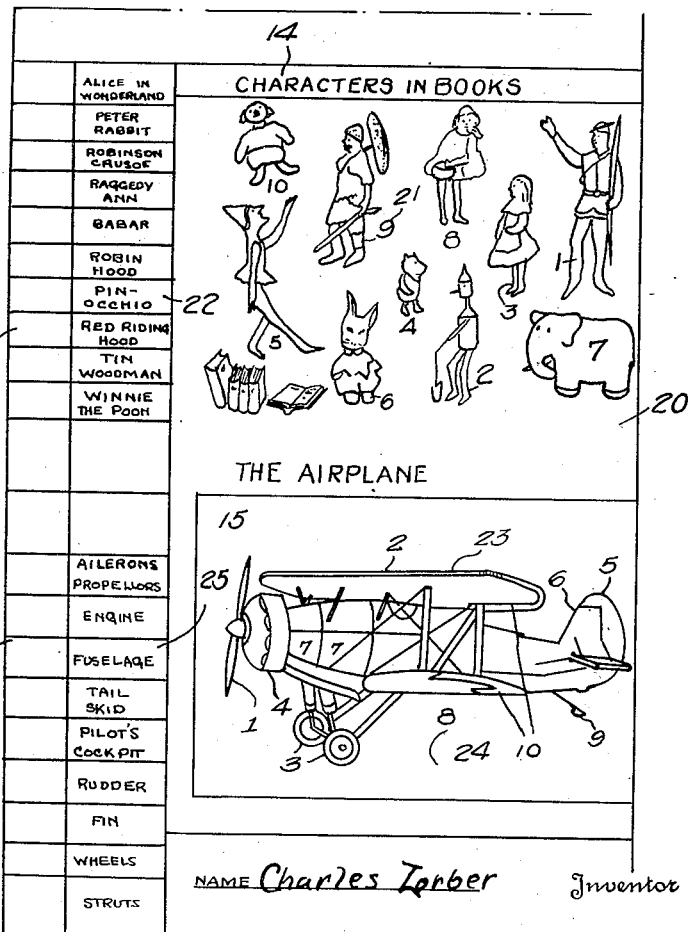
Figure 3 is a fragmentary view of the left portion of the first page of the upper section shown in Figure 1 and disclosing certain types of problems suitable for use in this invention.

In the invention as herein disclosed there has been shown two sections of a newspaper, one of these being an upper section 10 and the other being a lower section 11. In the diagrammatic views each section is indicated as having a single sheet folded midway of its width to present a first page 12 of section 10 and 13 of section 11. It is to be noted however that each section may have as many sheets or plies as desired as is common in newspapers. In any case it is the first page of each section that is particularly concerned with this invention. Whatever the number of sheets or plies in the sections the upper section is not connected to the lower section but is free to slide bodily on the lower section.

In order to illustrate the arrangement and some of the types of problems and answers which may be used in carrying out this invention there has been shown at the left edge portion of page 12 a pair of rectangularly outlined spaces 14 and 15 and between this pair of spaces and the left there is provided columns of defined blank spaces 16 and 17 the use of which will be presently explained. At the left side edge portion of page 13 there are provided columns of correct answers to the problems in the spaces 14 and 15 as indicated at 18 and 19. In order to accommodate the test to the use of younger children there may be illustrated in the space 14 a series of drawings 20 each representing a well known character from a children's book. Associated with each drawing is a number 21. Between the group of drawings and the column of blank spaces 17 there is printed a column 22 giving the names of the characters illustrated, each name being opposite one of the spaces of column 16.

In using this form of test the user observes one of the figures and decides which character it is believed the character represents. This is done while the second section of the newspaper is completely covered by the first section. The user then looks in column 22 and in the adjacent blank space to that bearing the character name selected inserts the number associated with the observed figure. This action is repeated until all the figures have been considered and all the blanks of column 22 filled. Next the first or upper section is moved to the right on the second section until the answer column 19 is exposed with the numbers therein opposite the spaces in the column 22. Then, by comparison of the inserted numbers with the answer numbers the accuracy of the child's knowledge with respect to the drawn characters is shown.

The space 15 is shown as having printed therein a set of problems for more advanced persons. Here there is disclosed the outline drawing of an airplane 23 the various parts of which have indicating numbers 24 associated therewith. At the left of this view there is a column 25 bearing the names of the numbered parts. The column 25 is associated with the column 17 in the manner of the previously described test and the test is carried out in like manner.

A further arrangement of test is shown at the right portions of the pages one of the two sections. Here there is a defined space 26 wherein is printed a column of statements, the test being as to the truth or falsity of these statements. Between the space 26 and the right margin of the page 12 on which the statements are printed there is a column of suitably defined blank spaces for the entry of initials "T" or "F" according to the thought of the person taking the test. This column is indicated at 27. On the first page of the lower section there is provided a column 28 of indicia showing the truth or falsity of the statements made in the test. As before the test is taken with the lower section entirely covered but by movement of the upper section to the left the column 27 may be brought into registry with the column 28 and the correctness of the answers inserted in the column ascertained. Alongside the column 28 there may be a column of explanatory matter as shown at 29.

It is to be noted that, as shown in the drawings, the spaces for the questions on one section and the spaces for the information or answers on the other are equal in vertical extent and the spaces for each answer and question are of equal vertical extent and are arranged to be oppositely alined.

It will be obvious that the types of tests here shown are merely examples of a large variety of tests which may be devised in connection with the upper and lower sections of a newspaper, the problems and spaces for answers being arranged on the upper section and the answers arranged on the lower section being true answers.

What is claimed, is:

1. In a knowledge testing device, a pair of newspaper sections, one being superimposed on the other to form upper and lower sections, the upper section being freely slidable bodily on the lower section, the upper section having a first page carrying a marginally disposed unbroken and imperforate spaces bearing a series of printed knowledge tests and the lower section having a first page carrying a correspondingly marginally disposed unbroken and imperforate spaces bearing a series of printed informations giving the truth or falsity of replies made to said tests, the marginally disposed tests and the marginally disposed information being of equal vertical dimension and each information space being correspondingly positioned and of equal vertical dimension to the test relating thereto.

2. In a knowledge testing device, a pair of newspaper sections, one being superimposed on the other to form upper and lower sections, the upper section being freely slidable bodily on the lower section, the upper section having a first page provided at one lateral edge portion with a columnar unbroken and imperforate spaces bearing a series of printed knowledge tests and the lower section having a first page carrying on the corresponding lateral edge portion a columnar unbroken and imperforate spaces bearing a series of information printing giving the truth or falsity of answers made by a user to the tests on the upper section, the marginally disposed tests and the marginally disposed information being of equal vertical dimension and each information space being correspondingly positioned and of equal vertical dimension to the test relating thereto.

3. In a knowledge testing device, a pair of newspaper sections, one being superimposed on the other to form upper and lower sections, the upper section being freely slidable bodily on the lower section, the upper section having a first page carrying a marginally disposed unbroken and imperforate spaces bearing a series of printed knowledge tests and a column of defined blank spaces for entry of putative answers to said tests, the lower section having a first page carrying a correspondingly marginally disposed unbroken and imperforate spaces bearing a series of printed informations giving the truth or falsity of replies made to said tests as entered in said blank spaces, the marginally disposed tests and the marginally disposed information being of equal vertical dimension and each information space being correspondingly positioned and of equal vertical dimension to the test relating thereto.

4. In a knowledge testing device, a pair of newspaper sections, one being superimposed on the other to form upper and lower sections, the upper sections being freely slidable bodily on the lower section to expose the lateral edge portions of the latter selectively, the upper section having a first page provided at each lateral edge portion with a columnar unbroken and imperforate spaces bearing a series of tests and a columnar series of defined blank spaces, the series of blank spaces being disposed between the respective series of tests and the adjacent margin of the page, the lower section having a first page provided at each lateral edge portion with a columnar unbroken and imperforate spaces bearing a series of information printing giving information as to the truth or falsity of the answers given by the user in said blank spaces, the marginally disposed tests and the marginally disposed information being of equal vertical dimension and each information space being correspondingly positioned and of equal vertical dimension to the test relating thereto.

CHARLES LORBER.

REFERENCES CITED

The following references are of record in the file of this patent:

UNITED STATES PATENTS

| Number | Name | Date |
|---|---|---|
| 1,163,184 | Thompson | Dec. 7, 1915 |
| 2,052,369 | Toops | Aug. 25, 1936 |

OTHER REFERENCES

Washington Times Herald for July 29, 1941, pages containing questions and answers to item labeled "Test Your Horse Sense."